US010590657B2

(12) United States Patent
Suput et al.

(10) Patent No.: US 10,590,657 B2
(45) Date of Patent: Mar. 17, 2020

(54) FIBER CEMENT ARTICLES WITH ULTRA-SMOOTH EXTERIOR SURFACE AND METHODS FOR MANUFACTURING SAME

(71) Applicant: James Hardie Technology Limited, Dublin (IE)

(72) Inventors: Marko Suput, Lompoc, CA (US); William Munch, Los Angeles, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 15/942,139

(22) Filed: Mar. 30, 2018

(65) Prior Publication Data

US 2018/0291634 A1 Oct. 11, 2018

Related U.S. Application Data

(60) Provisional application No. 62/480,202, filed on Mar. 31, 2017.

(51) Int. Cl.
*E04F 13/08* (2006.01)
*E04F 13/14* (2006.01)
*B28B 1/52* (2006.01)
*B32B 3/30* (2006.01)
*B32B 13/02* (2006.01)

(52) U.S. Cl.
CPC .......... *E04F 13/0866* (2013.01); *B28B 1/52* (2013.01); *E04F 13/148* (2013.01); *B32B 3/30* (2013.01); *B32B 13/02* (2013.01); *B32B 2250/40* (2013.01); *B32B 2255/02* (2013.01); *B32B 2262/02* (2013.01); *B32B 2262/062* (2013.01); *B32B 2305/026* (2013.01); *B32B 2305/22* (2013.01); *B32B 2307/538* (2013.01); *B32B 2317/18* (2013.01); *B32B 2607/00* (2013.01)

(58) Field of Classification Search
CPC ... E04F 13/0866; E04F 13/148; E04F 13/142; B28B 1/50; B28B 1/52
USPC ........................................................ 52/309.9
See application file for complete search history.

(56) References Cited

U.S. PATENT DOCUMENTS

| 1,702,730 | A | * | 2/1929 | Hite | B28B 1/16 |
| | | | | | 264/42 |
| 2,878,666 | A | * | 3/1959 | Drummond | C04B 38/00 |
| | | | | | 200/33 D |
| 3,607,607 | A | * | 9/1971 | Beninga | C04B 41/009 |
| | | | | | 156/114 |
| 3,949,144 | A | * | 4/1976 | Duff | E04C 2/26 |
| | | | | | 428/414 |

(Continued)

FOREIGN PATENT DOCUMENTS

| DE | 10118385 | A1 | * | 10/2002 | ............ B32B 21/02 |
| JP | 2017106315 | A | * | 6/2017 | |

*Primary Examiner* — Patrick J Maestri
*Assistant Examiner* — Joseph J. Sadlon
(74) *Attorney, Agent, or Firm* — Knobbe, Martens, Olson & Bear, LLP

(57) ABSTRACT

Described herein are cementitious articles having an integrally formed exterior surface with ultra-smooth finish and reduced porosity and/or thickness relative to the core of the cementitious article. Described herein are also techniques and methods for producing fiber cement articles having a thin exterior shell characterized by improved smoothness and reduced porosity.

19 Claims, 17 Drawing Sheets

(56) References Cited

U.S. PATENT DOCUMENTS

| | | | | |
|---|---|---|---|---|
| 3,965,633 A | * | 6/1976 | Carroll | E04B 7/00 52/309.8 |
| 3,979,217 A | * | 9/1976 | Sutton | B28B 1/008 106/675 |
| 4,053,677 A | * | 10/1977 | Corao | B32B 13/02 442/17 |
| 4,252,767 A | * | 2/1981 | Piazza | B28B 19/003 264/256 |
| 4,312,822 A | * | 1/1982 | Bonnet | B05D 1/18 264/70 |
| 4,327,146 A | * | 4/1982 | White | B28B 1/50 428/308.8 |
| 4,376,595 A | * | 3/1983 | Shaw | C04B 20/12 404/17 |
| 4,378,405 A | * | 3/1983 | Pilgrim | B28B 5/027 428/322.7 |
| 4,446,091 A | * | 5/1984 | Pairaudeau | B28B 7/34 264/225 |
| 4,669,240 A | * | 6/1987 | Amormino | E04B 1/04 264/253 |
| 4,774,045 A | * | 9/1988 | Kushida | B28B 1/008 264/133 |
| 4,876,151 A | * | 10/1989 | Eichen | B28B 1/16 428/446 |
| 4,923,606 A | * | 5/1990 | Gresh | B01D 24/4631 210/275 |
| 5,002,620 A | * | 3/1991 | King | B28B 1/50 156/153 |
| 5,030,502 A | * | 7/1991 | Teare | B32B 13/14 428/193 |
| 5,189,856 A | * | 3/1993 | Windstrup | B28B 19/00 52/309.12 |
| 5,473,849 A | * | 12/1995 | Jones, Jr. | B32B 13/02 52/424 |
| 5,582,670 A | * | 12/1996 | Andersen | C08L 1/28 156/242 |
| 5,797,238 A | * | 8/1998 | Berntsson | B28B 1/008 264/228 |
| 6,464,914 B1 | * | 10/2002 | Graf | B27N 3/10 264/109 |
| 6,898,911 B2 | * | 5/2005 | Kornfalt | E04C 2/04 52/783.14 |
| 6,941,720 B2 | * | 9/2005 | DeFord | E04C 2/04 52/783.14 |
| 7,089,709 B2 | * | 8/2006 | Waggoner | B28B 1/527 52/518 |
| 7,105,073 B2 | * | 9/2006 | Crane | B32B 5/18 156/256 |
| 7,524,555 B2 | * | 4/2009 | Peng | B32B 7/12 428/294.7 |
| 7,600,356 B2 | * | 10/2009 | Benjamin | E04F 13/04 52/461 |
| 7,749,593 B2 | * | 7/2010 | Kalkanoglu | B44F 1/10 428/212 |
| 7,785,703 B2 | * | 8/2010 | Agrawal | B32B 5/18 428/317.9 |
| 8,287,671 B2 | * | 10/2012 | Pastore | B29C 44/0461 156/276 |
| 8,461,067 B2 | * | 6/2013 | Smith | B28B 19/0092 442/386 |
| 8,497,010 B2 | * | 7/2013 | Bletsos | B32B 5/022 428/137 |
| 9,010,054 B2 | * | 4/2015 | Herdt | B29C 44/1214 52/220.2 |
| 9,260,864 B2 | * | 2/2016 | Cole | E04F 13/148 |
| 9,573,343 B2 | * | 2/2017 | Pervan | B32B 5/30 |
| 10,132,097 B2 | * | 11/2018 | Herfurth | E04B 1/24 |
| 2006/0123736 A1 | * | 6/2006 | Futterman | C04B 26/06 52/742.16 |
| 2008/0141908 A1 | * | 6/2008 | Peng | C04B 20/1029 106/713 |
| 2015/0375431 A1 | * | 12/2015 | Zavala | B28B 1/525 264/319 |

\* cited by examiner

FIBER CEMENT ARTICLES WITH ULTRA-SMOOTH EXTERIOR SURFACE AND METHODS FOR MANUFACTURING SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure generally relates to fiber cement articles suitable for use as either wall or floor panels, and methods of making the same.

Description of the Related Art

Any discussion of the prior art throughout the specification should in no way be considered as an admission that such prior art is widely known or forms part of the common general knowledge in the field.

Fiber cement panels are typically manufactured using the Hatschek process, which introduces unique design considerations not encountered in traditional poured-mold concrete applications. The Hatschek process utilizes a series of sieves and rollers partially submerged within vats containing a cementitious slurry formed from water, fibers, silica, cement and other additives. As the sieves rotate, thin films of the fiber cement composition are built up on the surface of the sieve before being transferred upon contact to a felt. As the felt passes over each successive vat in the series, it picks up a corresponding series of sequential layers of film from the sieves. The stacked layers undergo additional processing steps, such as dewatering and drying to form a fiber cement greensheet. The greensheet is subsequently trimmed to size and cured. The final fiber cement panel typically has somewhat rough and uneven exterior surfaces largely due to the nature of fiber cement and the manufacturing process. As such, paint and other coatings are typically applied over the fiber cement panels to try to smooth over the rough and uneven surfaces. Painting over fiber cement may mask some of the surface imperfections but still does not provide an ultra-smooth and polished appearance.

SUMMARY

Disclosed herein are various embodiments of a cementitious article having a cementitious core and an integrally formed ultra-smooth exterior surface having reduced porosity. The cementitious article can be a fiber cement article comprising a fiber cement substrate and a thin shell-like fiber cement layer integrally formed on at least one major face of the fiber cement substrate. The thin shell-like fiber cement layer provides an ultra-smooth finish to the fiber cement article and has a porosity that is lower than that of the fiber cement substrate. In some configurations, the reduced porosity and ultra-smooth exterior finish contribute to an improved weatherability and aesthetics of the fiber cement article.

In some embodiments, the cementitious article comprises a fiber cement substrate and a thin fiber cement shell that is integrally formed on at least one major face of the fiber cement substrate. The fiber cement shell is less porous and substantially thinner than the fiber cement substrate so as to provide a thin ultra-smooth exterior surface on the cementitious article. In one embodiment, the thickness of the fiber cement shell is 0.01% to 3% of the thickness of the fiber cement substrate. In certain implementations, the fiber cement shell has a thickness of between about 50 µm and 150 µm. In some configurations, the fiber cement substrate has a thickness of between about 4 mm and 8 mm, or between about 5 mm and 150 mm. The fiber cement shell provides the cementitious article with an ultra-smooth exterior surface having a mean porosity that is less than the mean porosity of the substrate. In some embodiments, the mean porosity of the fiber cement shell may differ from the mean porosity of the fiber cement substrate by at least 10%. Advantageously, the fiber cement shell provides the cementitious article with an ultra-smooth exterior surface, which, in some embodiments, has a surface roughness value of between 16 Rq and 8 Rq. In addition, in some implementations, the density of the fiber cement shell is greater than the density of the fiber cement substrate. In one embodiment, the density of fiber cement shell is between about 1.1 g/cm$^3$ and 1.8 g/cm$^3$ and the density of the fiber cement substrate is less than or equal to 1.33 g/cm$^3$ or between about 1 g/cm$^3$ and 1.33 g/cm$^3$. In another embodiment, the density of the fiber cement substrate is less than or equal to 1.33 g/cm$^3$ whereas the density of the integrally formed fiber cement shell is greater than 1.33 g/cm$^3$. In yet another embodiment, the density of the fiber cement shell may differ from the density of the fiber cement substrate by between about 5% and 30%, or by about 25%. Cellulose fibers and/or synthetic fibers can be used as reinforcement fibers for the fiber cement substrate and the fiber cement shell. In some implementations, the cementitious article further includes one or more layers of coating, such as sealants, primer and paint, disposed on the fiber cement shell.

In some embodiments, the cementitious article comprises an interior core and at least two opposing exterior faces integrally formed with the interior core, each face comprising a thin layer of cementitious material having a surface roughness value less than comparable cementitious articles manufactured using the conventional Hatschek process. In one embodiment, the surface roughness value of the two opposing exterior faces is between 15 Rq and 8 Rq. In another embodiment, the porosity of the two opposing exterior faces is lower than the porosity of the interior core. In yet another embodiment, the density of the cementitious article decreases as it extends from the exterior faces toward the interior core. The cementitious article can include cellulose fibers and/or synthetic fibers which are dispersed within the interior core and the exterior faces. In some configurations, a variable density fiber cement article is disclosed. In various embodiments, the variable density fiber cement article comprises a low density fiber cement core, and a high density integrally formed exterior shell. In some embodiments, the low density fiber reinforced cement core may have a density between about 1 g/cm$^3$ and about 1.33 g/cm$^3$. Likewise, in certain configurations, the high density exterior shell may have a density between about 1.1 g/cm$^3$ and about 1.8 g/cm$^3$. The low density fiber cement core may comprise cellulose fibers. In some embodiments, the high density exterior shell may comprise at least one laminate layer.

In some embodiments, a method for producing a fiber cement article having an integrally formed ultra-smooth exterior surface is disclosed. In some configurations, the ultra-smooth exterior surface exhibits reduced porosity in comparison to the fiber cement core. In one embodiment, the method includes the steps of forming a fiber cement greensheet, autoclaving the fiber cement greensheet to form a cured fiber cement article, compressing the cured fiber cement article at high pressure whereby the pressure is applied to the major faces of the article. In certain implementations, the pressure applied is sufficient to decrease the roughness of the exterior surface, and to reduce the porosity near the surface of the major faces. In some implementations, a separator sheet, such as a stainless steel plate, may be interposed between one or more of the cured fiber cement article(s). In one embodiment, the cured fiber cement article is compressed in a hydraulic press at a pressure of at least 800 psi. In another embodiment, the cured fiber cement article is compressed at a pressure of less than about 3,000 psi. In yet another embodiment, the cured fiber cement article is compressed at a pressure between about 1,000 psi and 2,500 psi. In yet another embodiment, the cured fiber cement article is subjected to compression for a dwell time of at least about 3 minutes. In other embodiments, the cured fiber cement article is subjected to compression for a dwell time of less than about 20 minutes. In some other embodiments, the cured fiber cement article is subjected to compression for a dwell time of about 5 minutes or about 15 minutes.

Also disclosed is a variable porosity fiber cement article. In some configurations, the variable porosity fiber cement article comprises a high porosity fiber cement core, having a porosity between about 9% and 15%; and an integrally formed low porosity exterior shell, having a porosity between about 8% and 14%. In some embodiments, the integrally formed low porosity exterior shell comprises at least one laminate layer. In certain implementations, the high porosity fiber cement core is reinforced with cellulose fibers. In still further configurations, the porosity of the integrally formed low porosity exterior shell has a porosity which differs from the high porosity interior core by about 5% to 30%.

BRIEF DESCRIPTION OF THE DRAWINGS

Embodiments of the disclosure will now be described, by way of example only, with reference to the accompanying drawings in which:

FIG. 13A depicts the original SEM image. FIG. 13B depicts the same image where the dark epoxy layer at the top has been changed to white. FIG. 13C shows the modified SEM image accompanied by a histogram comparing the percentages of white and black pixels.

DETAILED DESCRIPTION OF THE PREFERRED EMBODIMENT

Figure 1:
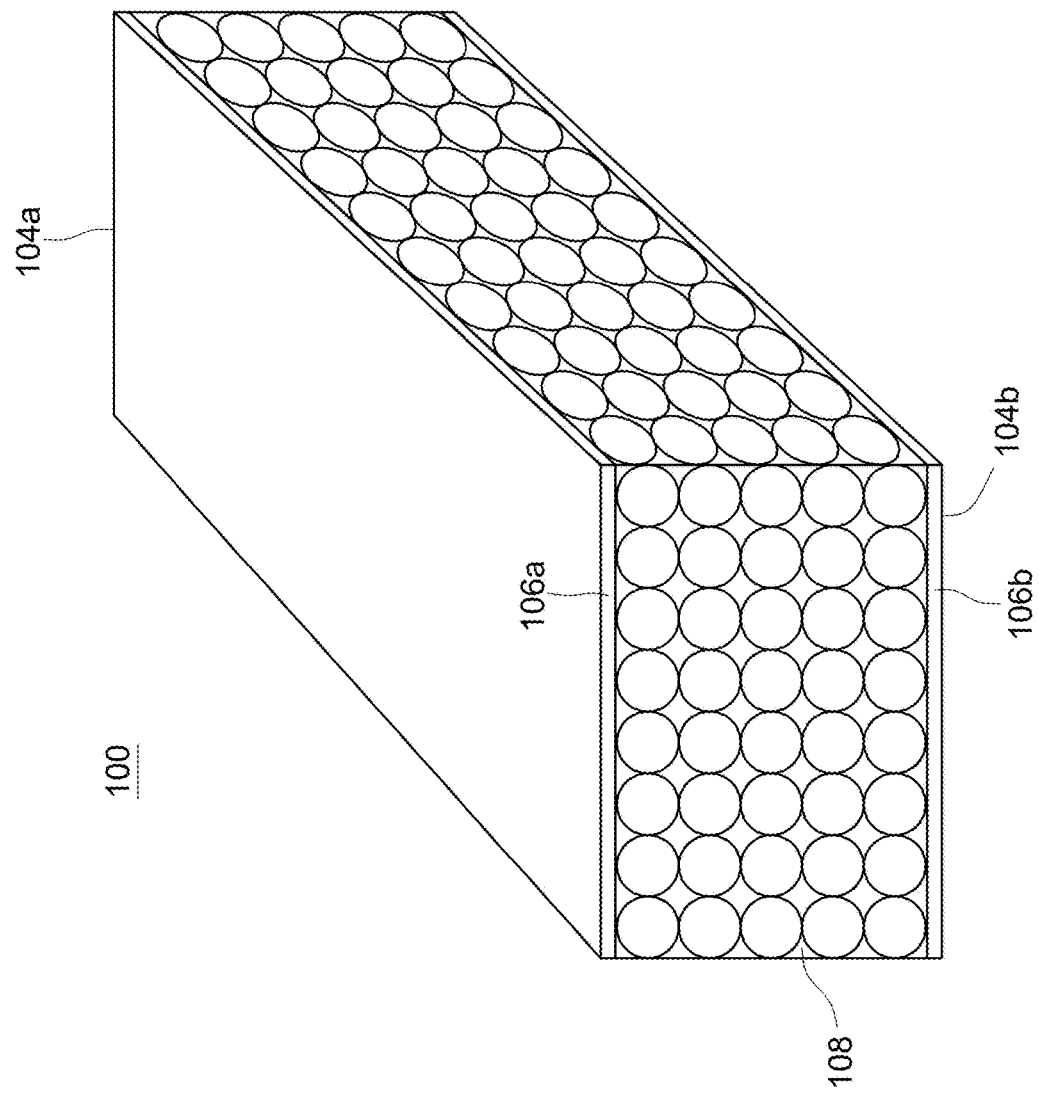
FIG. 1 is a representation of a cross section of a cementitious article prepared in accordance certain embodiments of this disclosure.

FIG. 1 is a schematic illustration of a fiber cement article having an integrally formed ultra-smooth exterior surface 100 manufactured in accordance with certain embodiments of the present disclosure. The fiber cement article 100 can take a wide variety of forms, such as panels, boards, planks, sheets, or any other suitable article. For instance, the fiber cement article can be in the form of a panel or board used in building construction such as internal wall or external cladding.

As shown in FIG. 1, the fiber cement article 100 generally comprises a fiber cement substrate 108 and thin fiber cement shell layers 106a, 106b integrally formed on opposing planar faces of the substrate 108. While the compositions of the fiber cement substrate 108 and the integrally formed fiber cement shell layers 106a, 106b may be substantially the same, the shell layers 106a, 106b have different porosity and density configured to provide an ultra-smooth finish and less porous protective exterior surface 104a, 104b for the fiber cement article 100. The ultra-smooth and less porous integrally formed exterior surface significantly improves the aesthetic quality of the fiber cement article by providing the fiber cement article with a uniform and polished appearance and imparts improved mechanical and functional characteristics, as will be discussed more fully below.

In some embodiments, each fiber cement shell layer 106a, 106b may extend across the entire horizontal cross section of the fiber cement article 100. Further, each fiber cement shell layer 106a, 106b may have a thickness ranging from about 0.02% to 3% of the thickness of the fiber cement substrate 108. For instance, the thickness of each fiber cement shell layer 106a, 106b may be about 0.02%, 0.05%, 0.1%, 0.2%, 0.5%, 1%, 1.2%, 1.5%, 2%, 2.5%, or 3% of the thickness of the fiber cement substrate 108. In some implementations, each fiber cement shell layer 106a, 106b may be thin and have a thickness ranging from about 50 µm to about 150 µm, such as about 50 µm, about 75 µm, about 100 µm, about 125 µm, about 150 µm, or any value therein. In some implementations, each fiber cement shell layer 106a, 106b can be as thin as a layer of paint such that the shell layers are akin to integrally formed ultra-smooth paint layers. In various configurations, the thickness of two fiber cement shell layers 106a, 106b are substantially the same.

In some embodiments, each fiber cement shell layer 106a, 106b may have a substantially lower porosity relative to the fiber cement substrate 108. Each fiber cement shell layer 106a, 106b may have a mean porosity that differs from the porosity of the fiber cement substrate 108 by as much as about 30%. In some embodiments, each fiber cement shell layer 106a, 106b may have a mean porosity that differs from the mean porosity of the fiber cement substrate 108 by about 0.5%, 1%, 2%, 5%, 10%, 15%, 20%, 25%, 30%, or any value therein. Each fiber cement shell layer 106a, 106b may be substantially non-porous having a mean porosity ranging from only about 7% to about 15%. The substantial reduction of porosity in the shell layers can impart improved water resistance and weatherability to the fiber cement articles.

In addition to low porosity, the density of the integrally formed fiber cement shell layers 106a, 106b may be higher relative to the density of the fiber cement substrate 108. In various configurations, the density of each exterior fiber cement shell layer 106a and 106b may be between 1.1 g/cm$^3$ and 1.8 g/cm$^3$, while the density of the fiber cement substrate 108 may be between 1 g/cm$^3$ and 1.33 g/cm$^3$. In some configurations, the density of the two exterior fiber cement shell layers 106a, 106b is substantially the same. In some configurations, the denser exterior shell layers 106a, 106b may serve to protect the less-dense fiber cement substrate 108 from damage.

The fiber cement article 100 produced in accordance with the present disclosure exhibit improved flatness and smoothness in comparison to fiber cement articles manufactured by the conventional Hatschek process. In some embodiments, the exterior surfaces 104a, 104b of the fiber cement article 100 have a low roughness value of between about 15 Rq. and 8 Rq, where lower numbers represent a smoother surface. In some embodiments, each of the exterior surfaces 104a, 104b of the fiber cement article 100 may have a roughness value of about 15 Rq, about 12 Rq, about 10, Rq, about 8 Rq, or any value therein. The lower roughness values, increased density, and reduced porosity provide the fiber cement article with an integrally formed shell layers having an ultra-smooth exterior finish that not only enhances the aesthetics but also improves the mechanical properties of the article.

As depicted in FIG. 1, each of the fiber cement shell layers 106a, 106b is integrally formed with fiber cement substrate 108 even though the porosity and density of the shell layers are different from those of the substrate. Accordingly, there is no need to bond or attach the fiber cement shell 106a, 106b with different physical properties to the fiber cement substrate 108 using adhesives or other binders, which may otherwise introduce a mechanical point of failure, thereby reducing the structural integrity of the finished fiber cement article.

Figure 2:
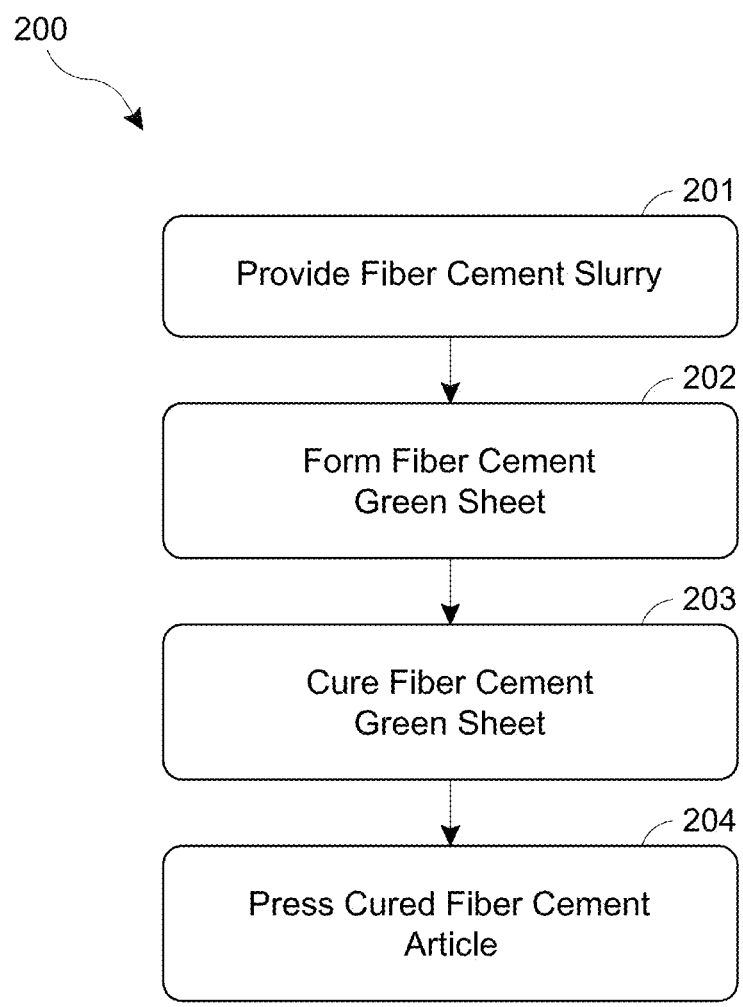
FIG. 2 illustrates a process flow chart for producing a cementitious article in accordance with certain embodiments of this disclosure.

An exemplary process for preparing an improved fiber cement panel having an integrally formed thin, ultra-smooth exterior surface is illustrated in FIG. 2. The illustrated process 200 for preparing the improved fiber cement article comprises the steps of: providing a fiber cement slurry 201; forming the slurry into a greensheet 202; autoclave curing the greensheet 203 to form a cured fiber cement article 204; and then subject the cured fiber cement article 204 to post-cure compression.

At step 201, a fiber cement slurry is provided. As will be discussed in more detail below, the fiber cement slurry can include binder, silica, fibers, density-modifying additives, and other additives or fillers admixed into an aqueous solution. The fiber cement slurry may be introduced into a containment vat using one or more feeds. Within the vat, the slurry may be mechanically agitated to homogenize the mixture. One or more rotating sieves reside partially submerged within the vat.

At step 202, layers of fiber cement are built upon the rotating sieve. As each sieve rotates through the fiber cement slurry, the aqueous mixture runs through the apertures of the sieve, depositing a thin film of the fiber cement mixture on the exterior surface of the sieve. These layers are retained on the exterior surface of the sieve as it continues to rotate and emerge from the vat. As the sieve completes its rotation, the accumulated layers of the fiber cement mixture are pressed against a felt, which forces much of the water out of the cementitious film, and acts to strip the cementitious film from the surface of the sieve. The felt carries the partially dewatered cementitious film to an accumulator roll, which gathers sequential layers of cementitious film into thicker slabs of fiber cement greensheet. These slabs of fiber cement greensheet may then be trimmed and sectioned to the desired dimensions.

At step 203, the trimmed slabs of fiber cement greensheet are cured using an autoclave. Autoclave curing is especially useful for compositions that include cellulose fibers because the process facilitates a reaction between the raw materials to form calcium silicate that bonds to the cellulose fibers. The specific conditions for autoclave curing are widely variable and depend on the formulation and desired characteristics of the final fiber cement article. For instance, in some embodiments, the fiber cement greensheets may be autoclave cured at temperatures ranging from about 150° C. to about 240° C. The pressure used may range from about 0.7 MPa in some embodiments to about 3.5 MPa in other embodiments. Likewise, the fiber cement greensheets may be subjected to an autoclave dwell time ranging from 2 to 48 hours, such as about 2 hours; about 4 hours; about 8 hours; about 16 hours; about 24 hours; about 32 hours; about 48 hours; or any value therein. Autoclave curing allows the fiber cement greensheet to harden to form a fiber cement article.

At step 204, the cured fiber cement article is subjected to post-cure compression. In some embodiments, post-cure compression can be performed in a mechanical press. The fiber cement articles may be stacked onto a press stack after they have been autoclave cured. In some implementations, a spacing sheet may be interposed between each of the cured fiber cement sheets. Moreover, in some embodiments, an additional spacing sheet may be inserted at the top and bottom of the press stack to separate the cured fiber cement sheets from the plates of the press. The spacing sheets may be made from any suitable material capable of withstanding the high pressure of the press. Metallic spacing sheets are typically preferred, though other materials may be used. In some embodiments, the spacing sheet may be stainless steel.

After the cured fiber cement sheets have been assembled into a press stack, the stack may be transferred to a press. The compressive forces of the press are imparted on the major faces of the fiber cement sheets in a manner so as to cause changes to the physical properties of the outer portions of the sheets. In some embodiments, the desired compressive force is supplied through the use of a hydraulic press. In some embodiments, the pressure from the compressive force may range from about 800 psi to about 3,000 psi. For instance, in some embodiments, the pressure may be about 800 psi; about 1,000 psi; about 1,200 psi; about 1,400 psi; about 1,600 psi; about 1,800 psi; about 2,000 psi; about 2,200 psi; about 2,400 psi; about 2,600 psi; about 2,800 psi; about 3,000 psi; or any value therein. It has been observed that increased dwell time at high pressure generally correlates with improved surface smoothness. In certain embodiments, the dwell time may range from about 2 to about 20 minutes for each fiber cement sheet. For instance, in some embodiments, the dwell time may be about 2 minutes; about 4 minutes; about 6 minutes; about 8 minutes; about 12 minutes; about 14 minutes; about 16 minutes; about 18 minutes; about 20 minutes; or any value therein.

After pressing, the press stack may be destacked. Destacking refers to the process of extracting the compressed stack from the press and separating the cured fiber cement articles from the interlaced separation sheets. It has been surprisingly found that the resultant fiber cement articles exhibit exterior shell layers that feature measurably reduced porosity, substantially increased smoothness and improved flatness as compared to fiber cement articles produced through traditional means. Moreover, the smooth exterior shell layers are integrally formed with the fiber cement article, thus obviating the need for binders or other adhesives to secure the densified exterior shell to the fiber cement substrate.

The techniques and methods described herein present significant advantages over traditional fiber cement manufacturing processes. For instance, the pressing process has been divorced from the fabrication process by allowing the fiber cement articles to cure by autoclaving before they are subject to post-cure compression. This allows for greatly increased production efficiency. Moreover, the risk of product loss due to greensheet delamination during the destacking process has been eliminated since the sheets have been cured prior to pressing.

In addition to the aforementioned production efficiencies, the combination of autoclave curing fiber cement compositions followed by post-cure compression under conditions described in the present disclosure surprisingly result in a fiber cement article with exterior shells having an ultra-smooth finish and favorable mechanical properties. The compositions, techniques and methods described herein produce smoother and flatter fiber cement sheets than those produced through traditional Hatschek processes, and enable the production of fiber cement panels having a thin ultra-smooth exterior shell characterized by reduced porosity. In some embodiments, the thin, ultra-smooth exterior shell has a substantially lower porosity as compared to the interior fiber cement substrate core. The reduced porosity of the exterior shell provides fewer points of ingress for environmental moisture, and thus imparts reduced water absorptivity and improved weather resistance when compared to fiber cement articles prepared in accordance with conventional processes.

Figure 3:
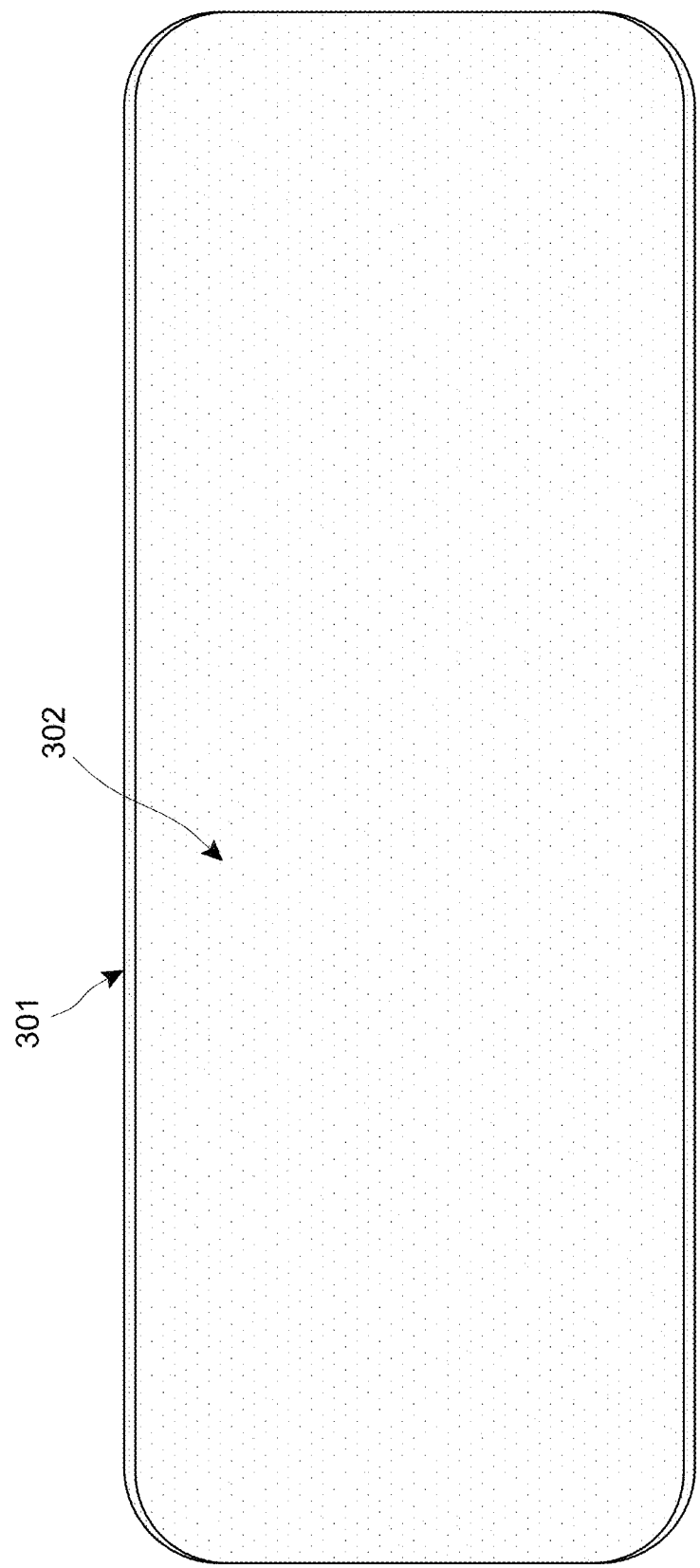
FIG. 3 is a representation of a cross section of a fiber cement article prepared in accordance with certain embodiments of this disclosure.

With reference now to FIG. 3, there is depicted a representation of an autoclave cured fiber cement article that has been subjected to post-cure compression in accordance with techniques and methods described herein. The fiber cement article of FIG. 3 comprises an exterior layer 301 and an interior layer 302. As shown in FIG. 3, the first exterior layer 301 exhibits a reduction in porosity, and corresponding increase in density, as compared to interior layer 302. This disproportionate deformation may result from the compressive forces imparted by a hydraulic press on the cured fiber cement sheet disproportionally distorting the outer layers of the article. For instance, in some embodiments, the cured fiber cement sheets may undergo disproportional deformation when compressed, resulting in an exterior layer of the fiber cement article having a higher density than the interior of the article. In some embodiments, the first exterior layer 301 may comprise at least one laminate layer. It has been found that laminate layers of the fiber cement sheet are especially prone to disproportional deformation.

Various cementitious compositions may be formulated for preparing fiber cement articles in accordance with the techniques and methods described herein. By way of example, a suitable cementitious composition may comprise one or more of: a cementitious binder, at least one reinforcing fiber type, at least one low density additive, at least one filler, and other additives.

In some embodiments, the fiber reinforced cementitious composition comprises about 20% to 45% by weight cementitious binder. For instance, the fiber reinforced cementitious composition may comprise one or more cementitious binders in an amount of about 20%; about 25%; about 30%; about 35%; about 40%; about 45%; or any value therein. The cementitious binder may comprise a cement. Suitable cements include, for example, Portland cement. Various forms of Portland cement are suitable, depending on characteristics required in the process and a finished product made from the composition, though other forms of cement may be used such as High Alumina Cements, or Sulfate Resistant Cements and the like. Suitable cements may have a fineness index of about 250-500 $m^2/kg$.

In some embodiments, the cementitious composition may comprise reinforcing fibers in an amount ranging from 3% to 10% by weight. In some implementations, the reinforcing fibers may include organic reinforcing fibers. Organic reinforcing fibers may comprise one or more organic polymer fibers. The one or more organic polymer fiber comprises cellulose fibers, for example Kraft pulp and the like. Typical dimensions of the one or more organic polymer fibers suitable for use are individual fiber diameter of between about 20 to 100 μm and fiber lengths of between about 2 to 7 mm, though the dimensions can be varied.

Similarly, the reinforcing fibers may comprise one or more synthetic organic fibers. Synthetic organic fibers can provide additional durability to a cementitious composite. Suitable synthetic organic fibers include, but are not limited to, polypropylene, PVOH, PVA, and the like. Typical dimensions of the one or more synthetic organic fiber suitable for use are individual fiber widths of between about 20 to 100 μm and fiber lengths of between about 2 to 12 mm.

In some embodiments, the fiber reinforced cementitious composition may comprise one or more low density additives. In some embodiments, the one or more low density additives may be at least partially reactive in the cementitious composition. Suitable low density additives include, for example, one or more of the group comprising cenospheres, synthetic microspheres, glass microspheres, ceramic microspheres, calcium silicate, expanded man-made minerals, expanded polymers, or the like, and mixtures thereof. In one embodiment, the expanded minerals comprise fully or partially expanded perlite, mica, vermiculite and clay.

In some embodiments, the fiber reinforced cementitious composition comprises about 35 to 68% by weight of at least one filler. The at least one inorganic filler may be selected from the group comprising natural, man-made mineral or synthetic man-made minerals which may be inert or at least partially reactive with the cement to form hydrated reaction products that are amorphous or at least partially crystalline. Suitable fillers in this category are typically derived from natural or synthetic sources and includes silica, silicate minerals, aluminosilicate minerals, carbonate minerals, and the like, and mixtures thereof. In some embodiments the at least one filler may be selected from the group comprising ground silica sand, ground silica rock, silica flour, silica fume, clays, partially dehydroxylated clays, carbonate minerals including man-made carbonate minerals, oxide minerals including man-made oxide minerals, and aluminosilicate minerals including man-made aluminosilicate minerals. In further embodiments, the at least one filler includes recycled intermediate fiber cement material derived from various stages of the manufacturing process.

In some embodiments, the fiber reinforced cementitious composition comprises about 0 to 6% by weight of at least one or more additives. Additives can improve mechanical properties or durability of a product formed from the fiber reinforced cementitious composition. Such additives may also be added to provide additional aesthetic or functional benefits. These additives comprise processing aids, cement set modifiers, fire retardants, pigments, dyes, rheology modifiers, pore blockers, mold inhibitors, and the like. In some implementations, the additives of the fiber reinforced cementitious composition comprise metal hydrates, such as alumina trihydrate.

In view of the foregoing, one exemplary formulation may comprise: a cementitious binder in an amount ranging from about 25% to about 45%; silica in an amount ranging from about 50% to about 60%; reinforcing cellulose fibers in an amount ranging from about 6% to about 10%; and additives in an amount ranging from about 2% to about 5%. However, it must be appreciated that the foregoing is provided for illustrative, rather than exhaustive, purposes and additional or alternate variations of the foregoing are contemplated and encompassed by the present disclosure. In particular, the above, or other, formulations may comprise a cementitious binder in an amount ranging from about 42% to about 45%.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

EXAMPLES

Example 1

A study was performed to test various conditions of post-cure compression of autoclave cured fiber cement panels prepared in accordance with the present disclosure. The control board was an autoclave cured fiber cement panel with roughness values equivalent to conventional fiber cement panels. The samples subject to post-cure compression were cut from the same piece of smooth fiber cement as the control panel, and were then subject to post-cure compression according to the techniques and methods described herein.

Figure 4:
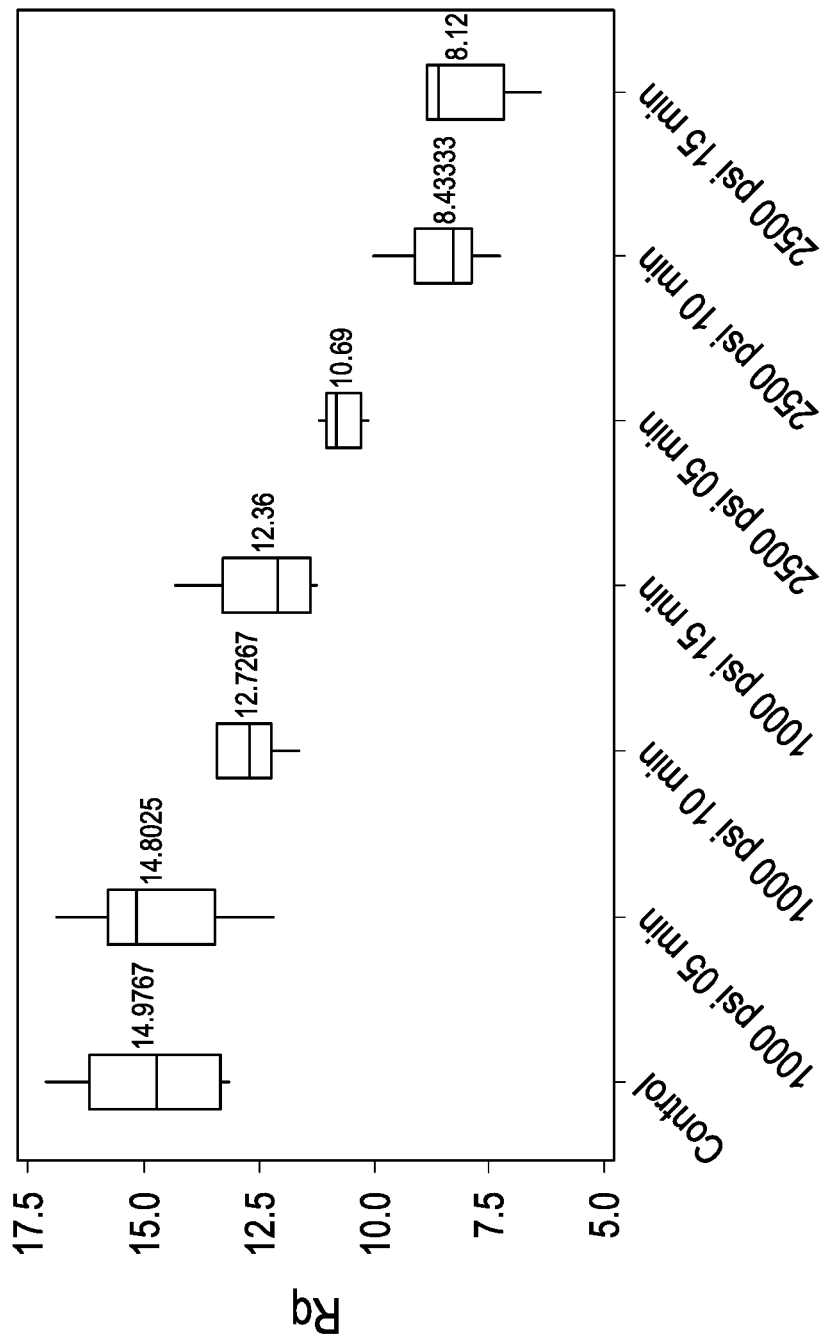
FIG. 4 is a boxplot depicting the results of smoothness testing performed on fiber cement articles prepared in accordance with certain embodiments of this disclosure.

Smoothness is reported as roughness in units of Rq. The lower the Rq value, the smoother the face of the panel. The results are depicted in FIG. 4. The numbers on the plot indicate the mean smoothness values. The data show that increased pressure, as well as increased dwell time at full pressure, significantly improves panel face smoothness. As shown in FIG. 4, the fiber cement panels show almost 50% reductions in surface roughness when the autoclave cured panel is subject to post-cure compression at 2,500 psi for 15 minutes.

Figure 5:
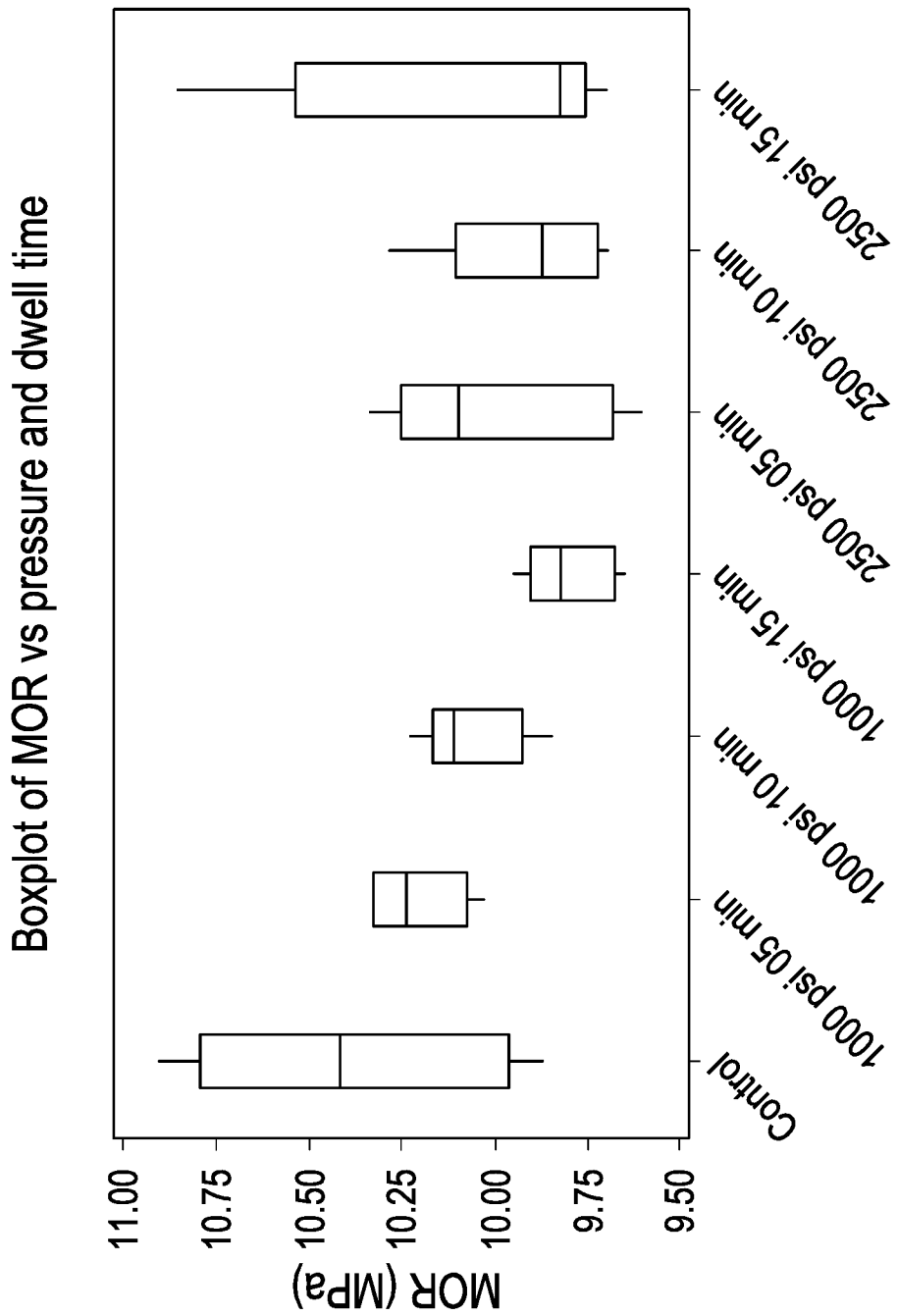
FIG. 5 is a boxplot depicting the results of flexural strength testing, expressed in MOR, as performed on fiber cement articles prepared in accordance with certain embodiments of this disclosure.

Modulus of Rupture (MOR) was also measured to determine whether the compression of the panel affects the flexural strength of the product. The results are shown in FIG. 5. The results show that post-cure compression at 2,500 psi, which resulted in significantly reduced roughness, does not cause any statistically significant changes to MOR.

Example 2

A study was performed to determine how various post-cure compression conditions affect the properties of the fiber cement article. The pressed samples were cut from the same piece of smooth fiber cement panel as their respective control, to ensure consistency between runs. The two conditions that were tested included fully saturated smooth fiber cement and double primed smooth fiber cement panel. Double priming of the smooth fiber cement was accomplished by running the article through a finishing line two times, with two passes of primer. Each condition was applied before the boards were pressed in a press. Each article was then subjected to the trial conditions. The same pressures and dwell times were used as in Example 1.

Smoothness was tested using a smoothness laser. Smoothness is reported as roughness in units of Rq. The lower the Rq value, the smoother the face of the article. The results for both conditions, fully saturated and double primed, were very similar to that of smooth fiber cement tested during the previous study. The increased pressure as well as increased time at full pressure exhibited measurable improvements to the smoothness of the face of each article.

Figure 6:
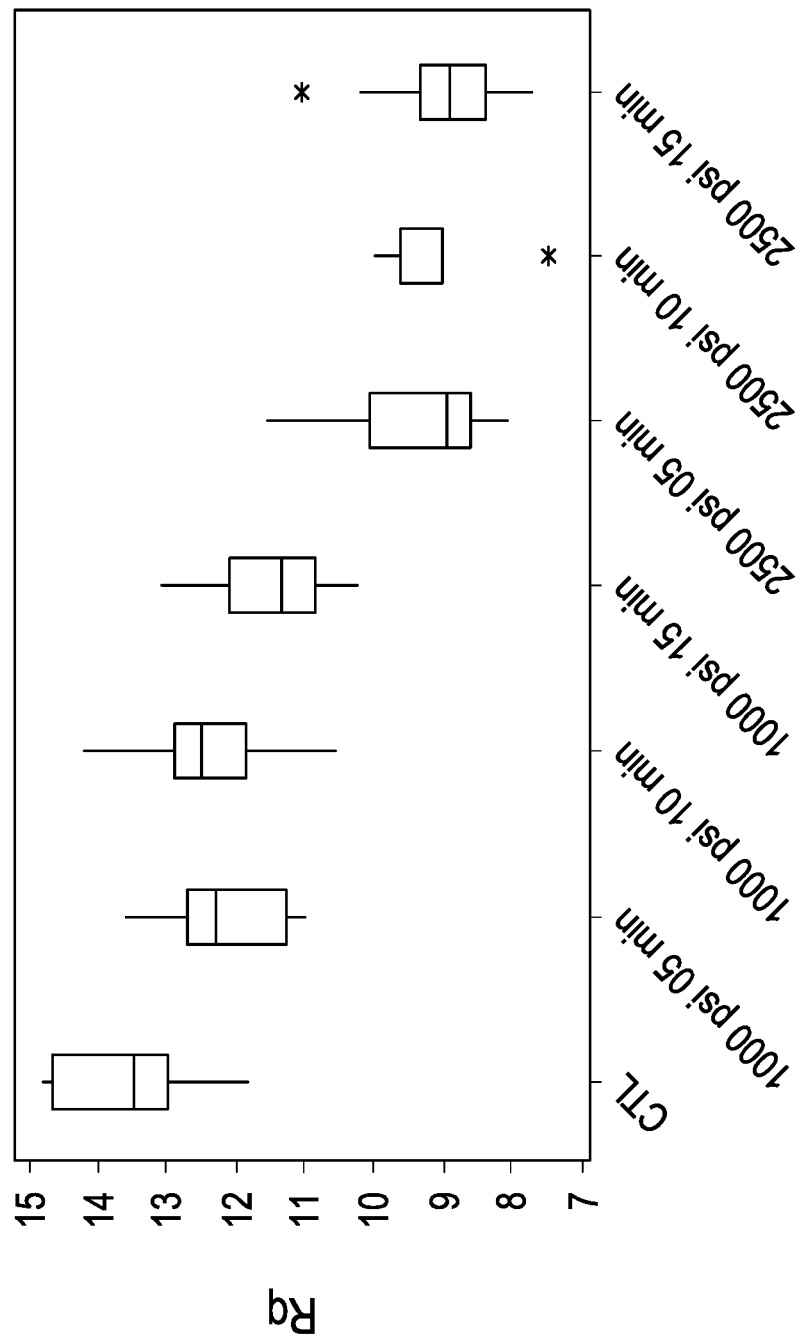
FIG. 6 is a boxplot depicting the results of smoothness testing performed on fully saturated fiber cement articles prepared in accordance with certain embodiments of this disclosure.

The fully saturated article smoothness results are depicted in FIG. 6. In this test, the control article was a fully saturated piece of smooth fiber cement panel. The results are consistent with those seen in the previous study, although an increase in smoothness was observed for the samples that were subjected to a dwell time of 5 minutes.

Figure 7:
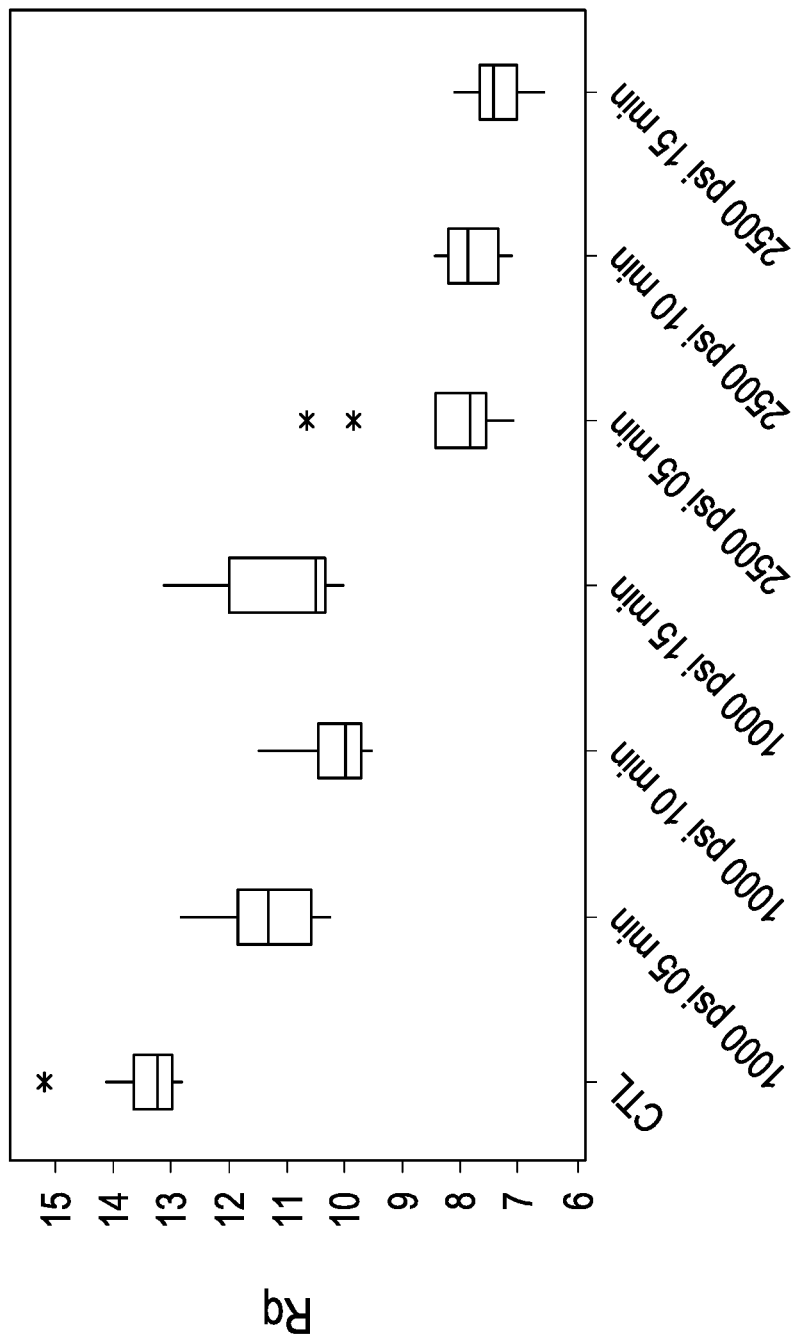
FIG. 7 is a boxplot depicting the results of smoothness testing performed on double primed fiber cement articles prepared in accordance with certain embodiments of this disclosure.

FIG. 7 shows the double primed smooth fiber cement panel smoothness results. The double primed smooth fiber cement panel was compared to a double primed smooth fiber cement control board. The autoclave cured fiber cement article subject to post-cure compressions exhibited the lowest Rq, and therefore, the highest smoothness, out of all three conditions tested.

Example 3

Figure 8:
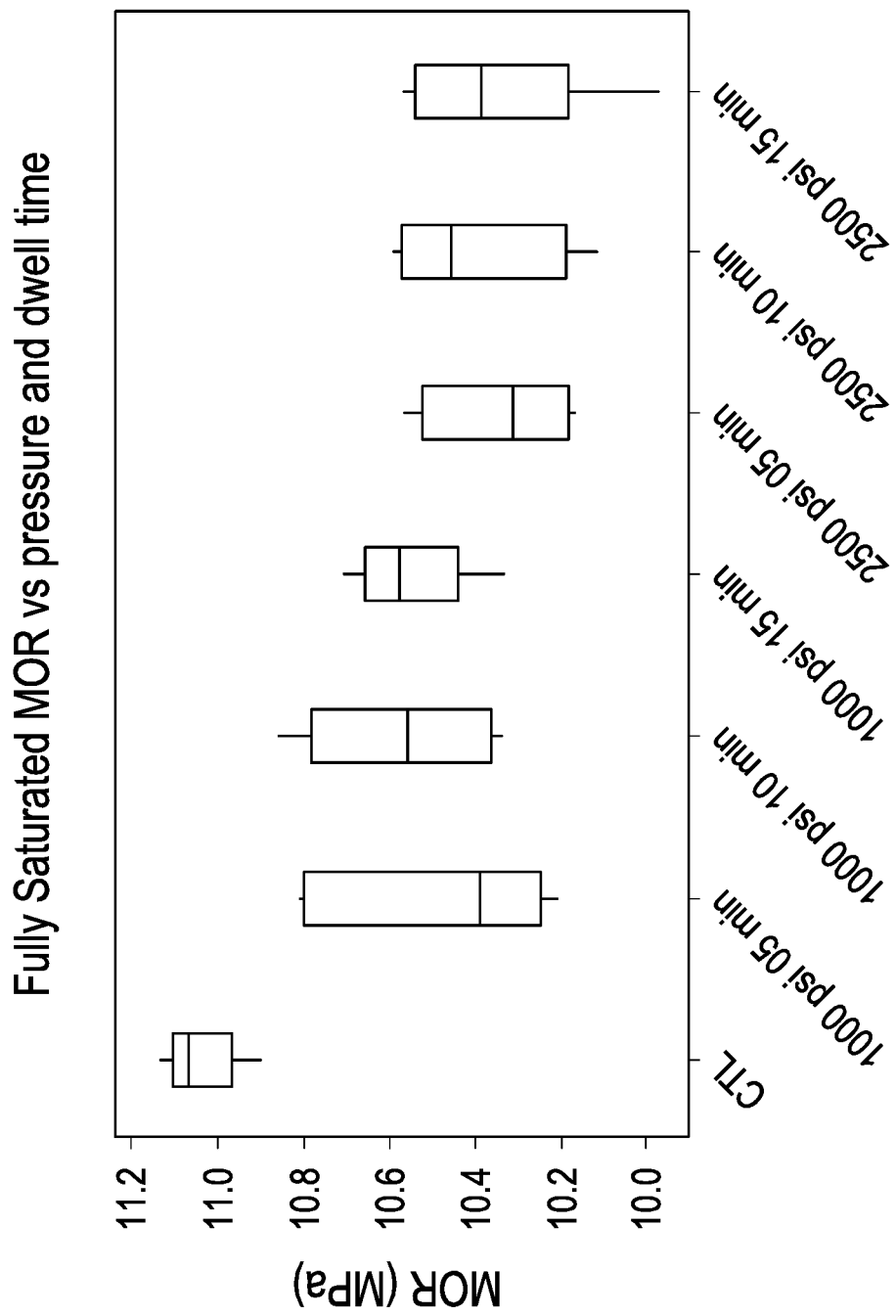
FIG. 8 is a boxplot depicting the results of flexural strength testing, expressed in MOR, as performed on fully saturated fiber cement articles prepared in accordance with certain embodiments of this disclosure.

To determine whether the compression of the article affects its flexural strength, the Modulus of Rupture (MOR) of each article was measured. FIG. 8 shows the MOR results for fully saturated samples. The results show that the trial conditioned exhibited a lower MOR than the control.

Figure 9:
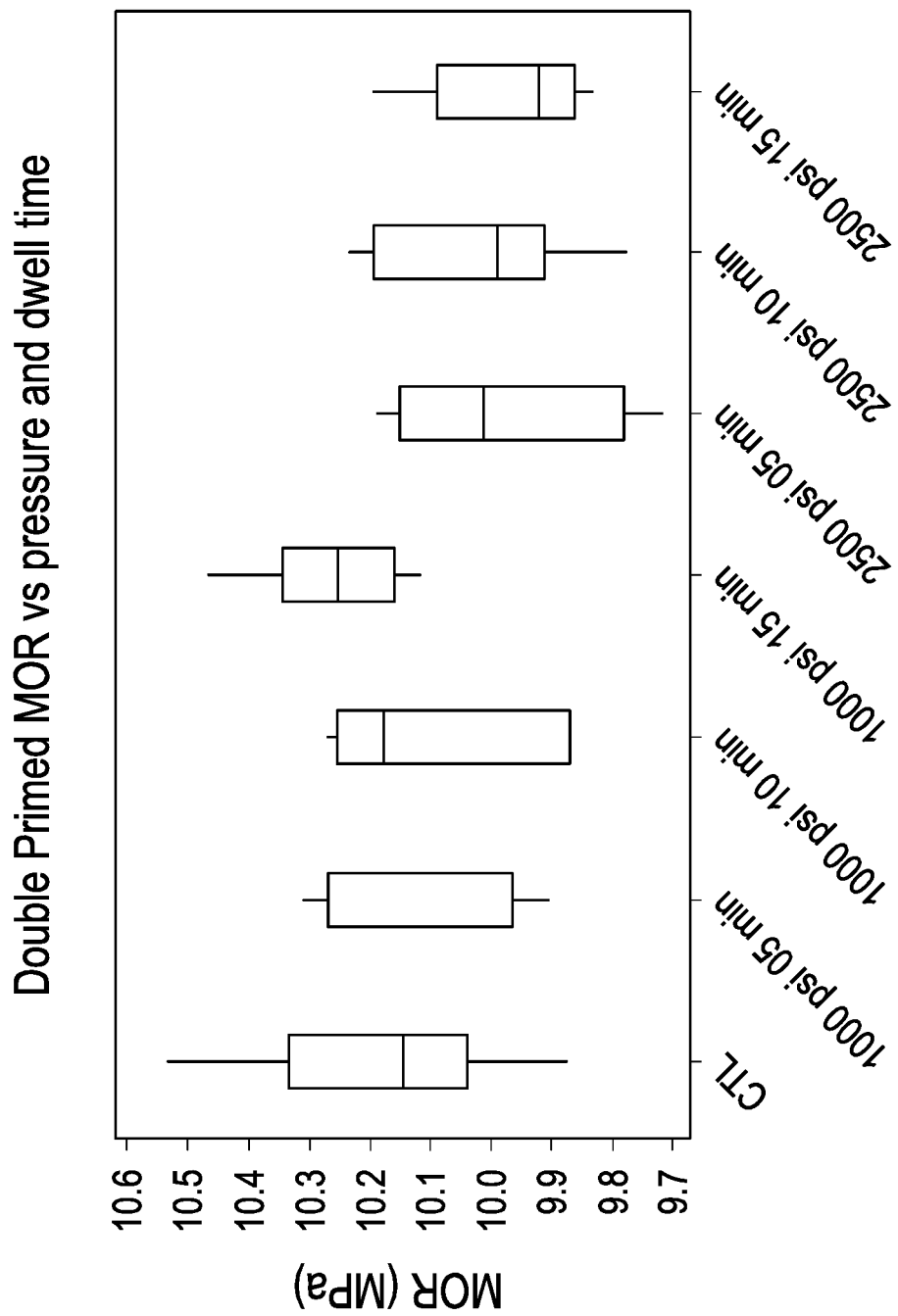
FIG. 9 is a boxplot depicting the results of flexural strength testing, expressed in MOR, as performed on double primed fiber cement articles prepared in accordance with certain embodiments of this disclosure.

FIG. 9 shows the MOR results for double primed samples. The results show that post-cure compression does not negatively affect the flexural strength of the resultant double primed fiber cement article.

Figure 10:
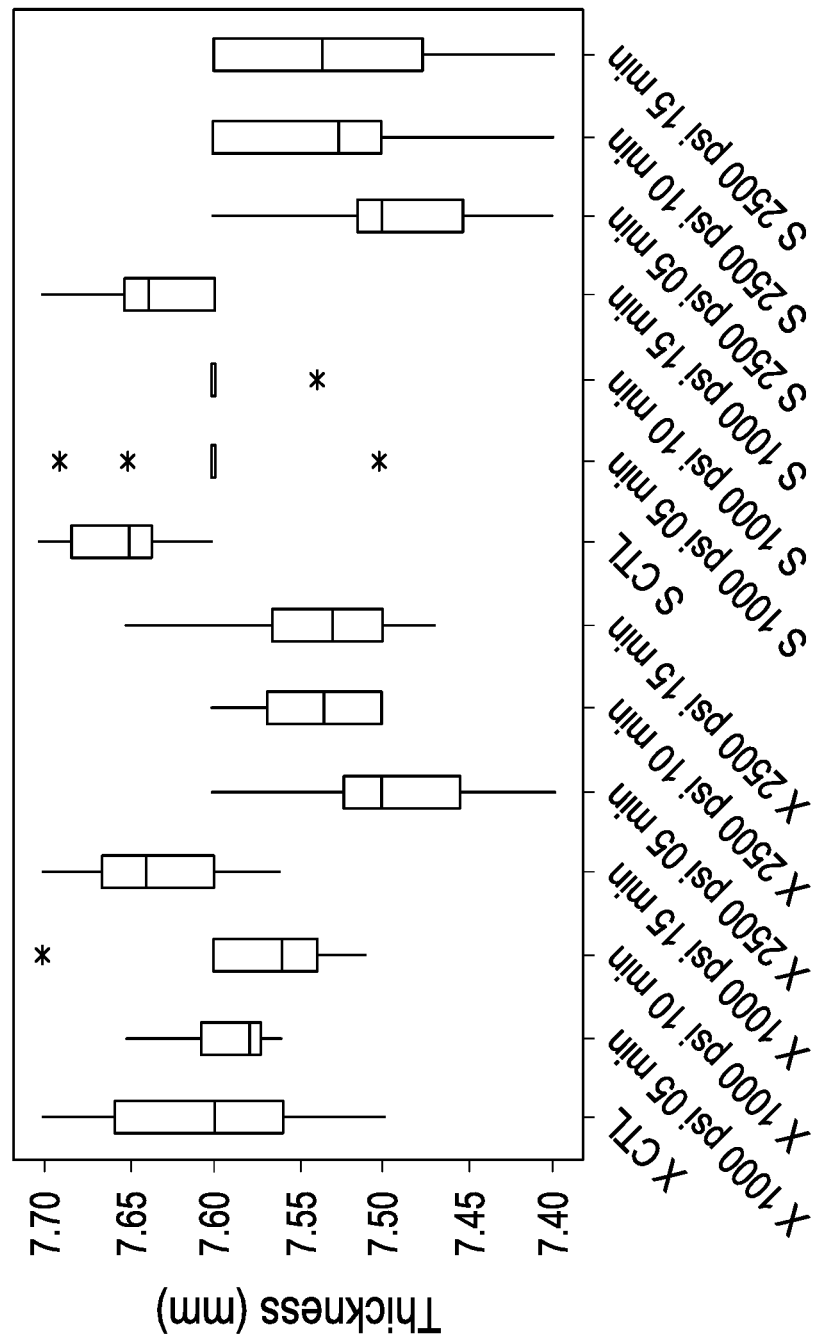
FIG. 10 is a boxplot depicting the effect of various pressures and dwell times on the thickness of double primed and fully saturated fiber cement articles prepared in accordance with certain embodiments of this disclosure.

FIG. 10 shows the thickness data for both test sheets. After pressing the double primed board ("X") at 2,500 psi, a maximum decrease in thickness of 1.43% was observed when compared to the control panel. After pressing the fully saturated condition board ("S"), at 2,500 psi a maximum decrease in thickness of 2.13% was observed when compared to the control article. This data suggests that density would also increase by 0 to 2% after post-cure compression.

Example 4

To further study the effect of post-cure compression of autoclave cured fiber cement boards, cross sections of pressed boards were analyzed under the scanning electron microscope (SEM). In this manner, it was possible to analyze the Primer Dry Film Thickness (DFT) to determine the extent to which the density of the primer layer increased as a result of the compressive forces imparted by the press. The SEM images were also used to study the porosity of the sample after pressing, as well as to evaluate its physical characteristics.

Figure 11:
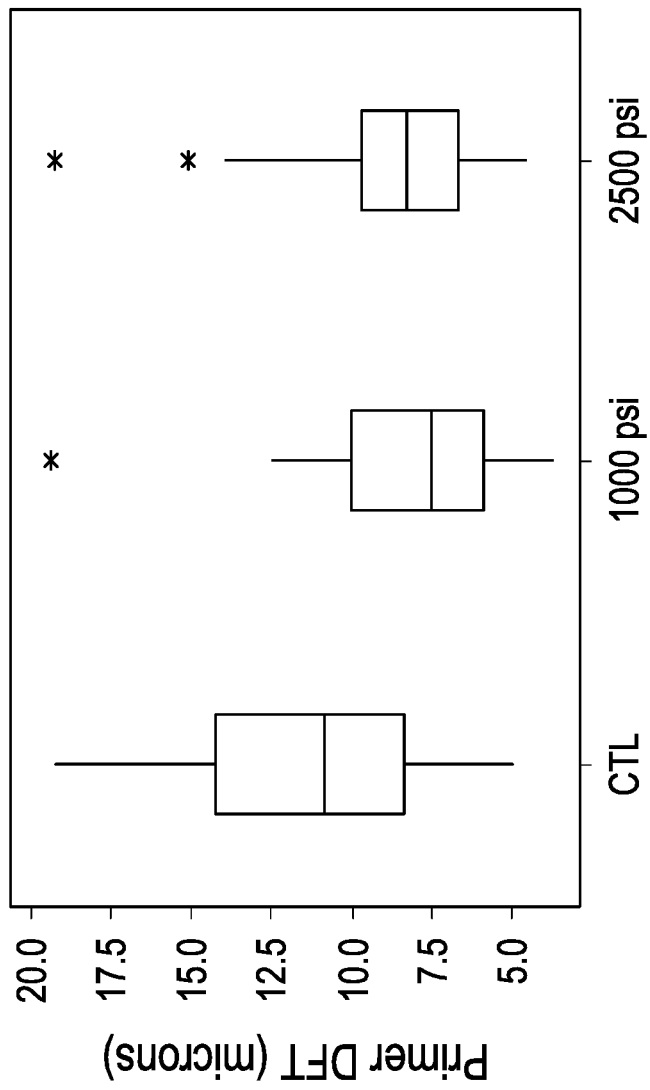
FIG. 11 is a boxplot depicting the effect of compression on the primer film thickness of fiber cement articles prepared in accordance with certain embodiments of this disclosure.
Figure 12:
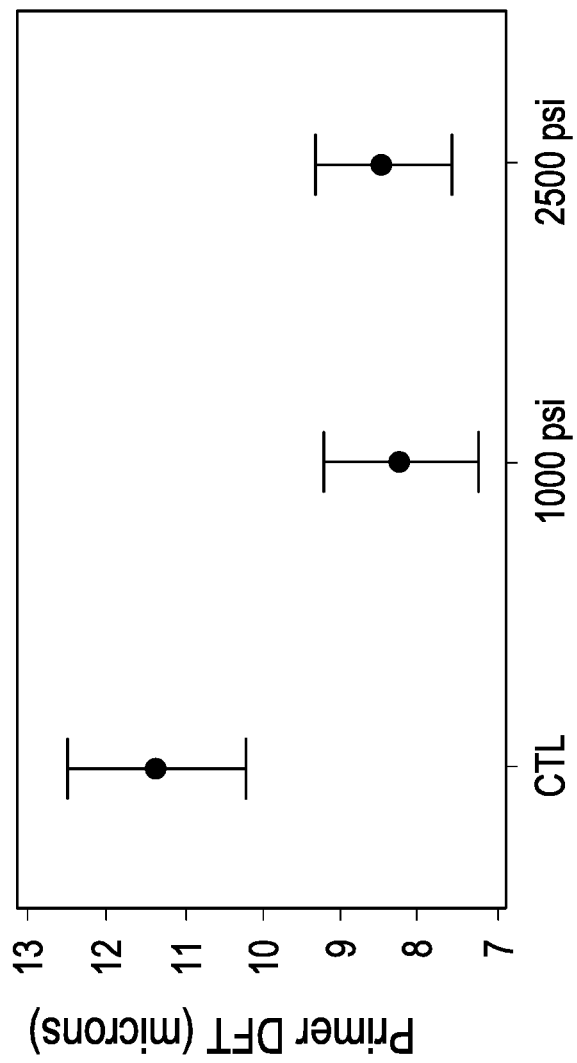
FIG. 12 is an interval plot depicting the effect of compression on the primer film thickness of fiber cement articles prepared in accordance with certain embodiments of this disclosure.

SEM images were taken from three samples: control; 1,000 psi; and 2,500 psi. The dwell time on both pressurized samples was 5 minutes. Since the primer was applied before pressing, and all samples came from the same sheet, the same amount of primer is on each sample. All samples were mounted in 2-part epoxy and polished prior to SEM analysis. Six images of each sample were taken and seven data points were taken on each image. FIG. 11 depicts a boxplot of the primer film thickness data, while FIG. 12 depicts an interval plot of the primer film thickness data. The data show that compressed post-autoclave cured articles show a statistically significant reduction in the primer dry film thickness, indicating that the primer layer exhibits measurably increased density as a result of pressing.

Next, the Porosity of samples was measured via image analysis of the SEM images. In an epoxy mounted SEM sample all voids (pores) are filled with epoxy under vacuum during sample preparation. These voids appear on a back-scattered SEM image as very dark areas due to the high molecular weight of the epoxy. Accordingly, it is possible to count the number of black pixels on an image to calculate the porosity of the sample. This is approximately equal to the volume percent of pores because the cross section is representative of the entire sample.

Figure 13A:
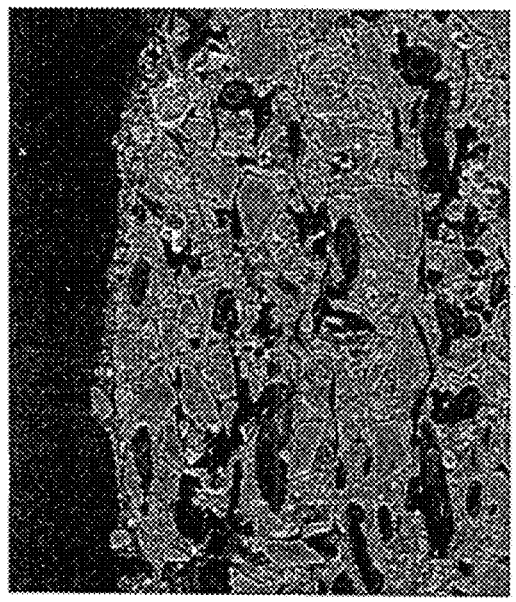
FIGS. 13A-C are scanning electron microscope (SEM) images depicting the porosity of a fiber cement article prepared in accordance with certain embodiments of this disclosure.
Figure 13B:
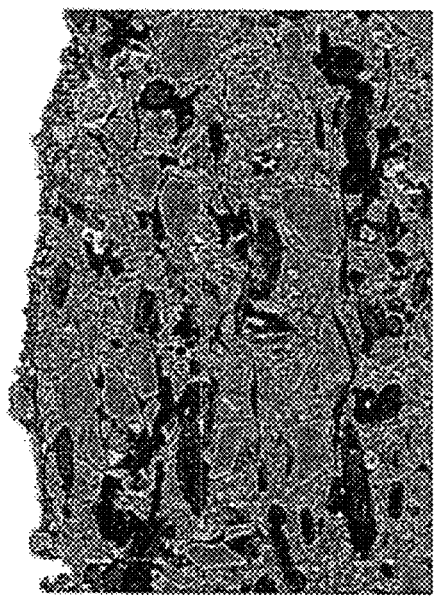
Figure 13C:
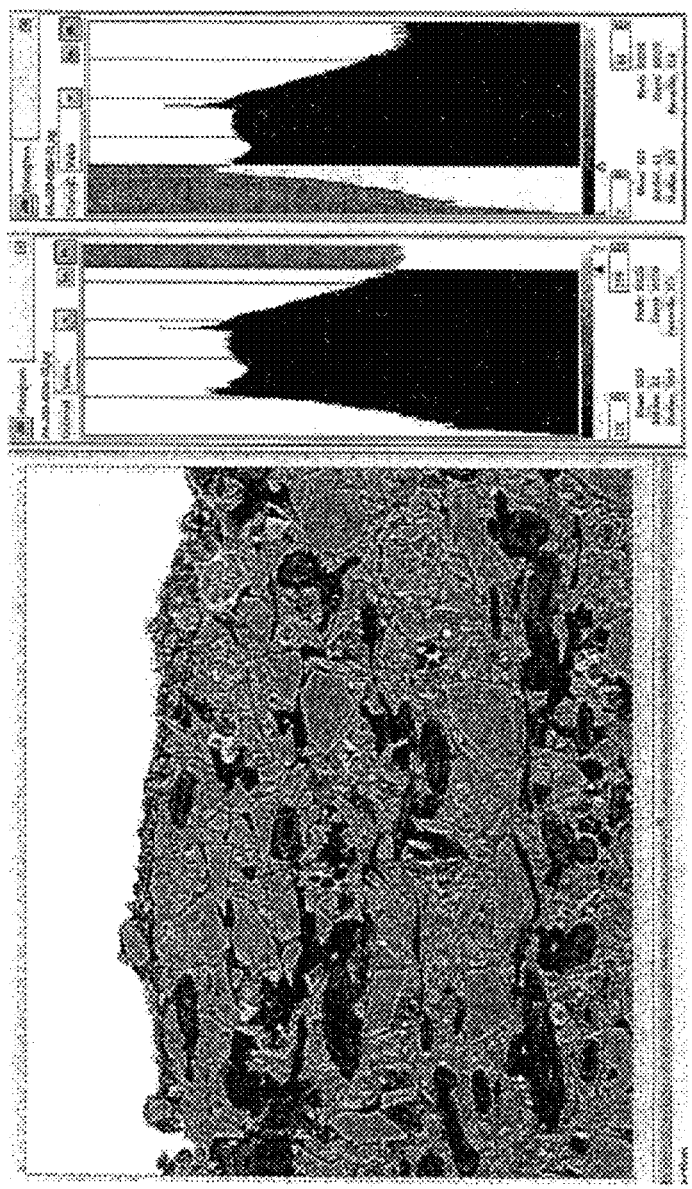

As an example, FIG. 13A shows the original backscattered SEM image for a 1,000 psi sample. FIG. 13B is the same image with the dark Epoxy layer at the top of the image changed to white in order to eliminate it from the analysis. FIG. 13C shows a histogram of the image colors giving the percentage of white pixels and the percentage of black pixels. The histogram for the percentage of black pixels counts the first peak, the epoxy peak, but does not count the second peak, which is the fiber peak. The SEM photos further allowed observation of any fracturing of the pressurized samples. Although some of the samples exhibited a small proportion of cracked silica particles, similar cracks were observed in the uncompressed control panels, and therefore, no clear effect could be attributed to the pressing.

Figure 14:
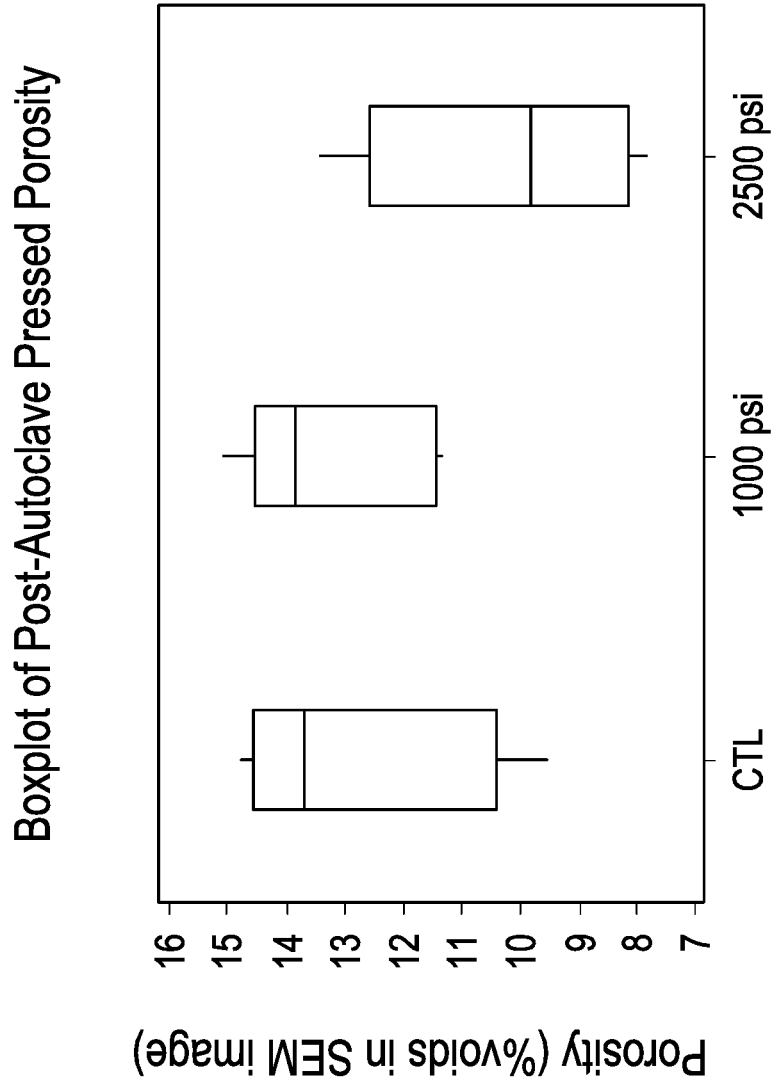
FIG. 14 is a boxplot depicting the porosity of fiber cement articles prepared in accordance with certain embodiments of this disclosure.
Figure 15:
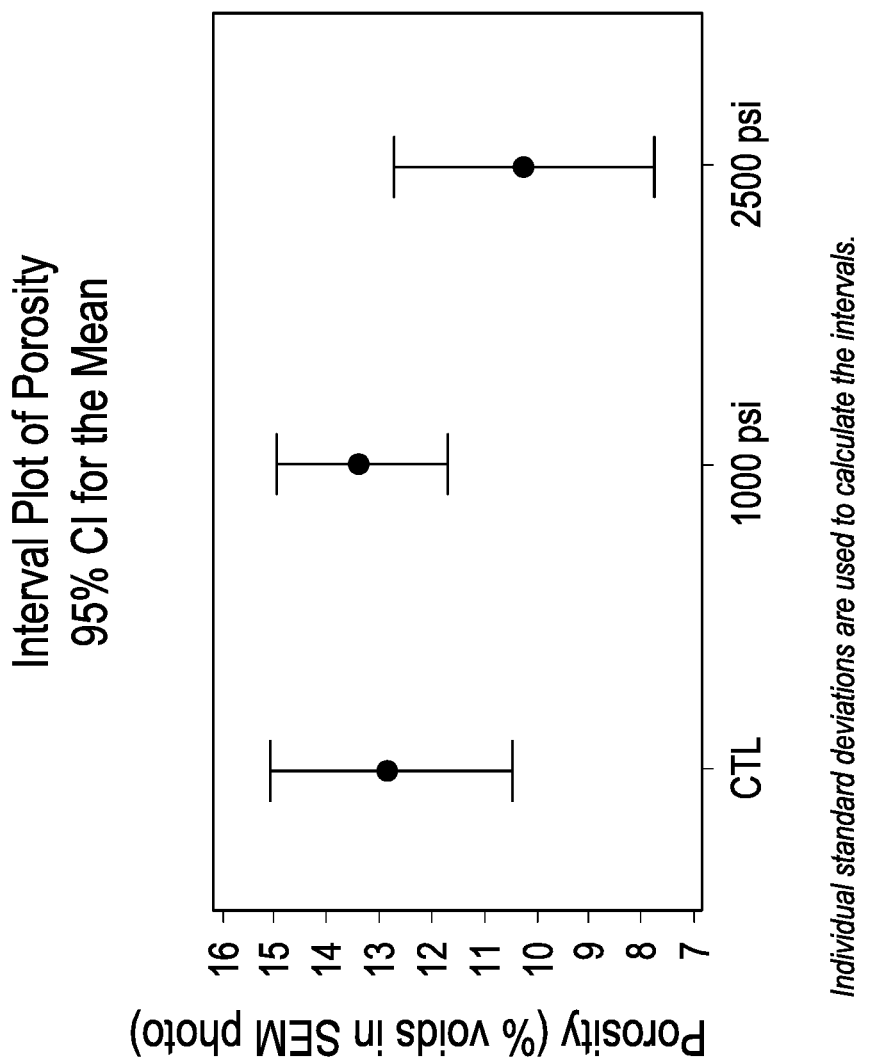
FIG. 15 is an interval plot depicting the porosity of fiber cement articles prepared in accordance with certain embodiments of this disclosure.

The porosity data is plotted in FIGS. 14 and 15. The data shows that 1,000 psi pressing does not produce a statistically significant reduction in mean porosity, but that pressing at 2,500 psi does show an apparent reduction in the mean porosity, having a p-value of 0.08. This data indicates that the percentage of voids present in the SEM image tends to decrease as a result of pressing at sufficient pressure. As explained above, the reduction in porosity, as represented by percentage void space, is correlated with improved mechanical characteristics including improved weatherability due to a decrease in the percentage of void space in the fiber cement article, which might otherwise provide a point of ingress for environmental moisture. As such, it can be inferred that subjecting autoclave cured fiber cement greensheet to post-cure pressures of about 2,500 psi is correlated with improved mechanical properties, such as improved durability and weatherability when compared to fiber cement articles prepared without mechanical compression of the cured greensheet.

While certain embodiments of the disclosure have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A variable porosity fiber cement article comprising:
   a high porosity fiber cement core having a porosity between about 9% and 15%; and
   an integrally formed low porosity exterior shell having a porosity between about 8% and 14%, wherein the integrally formed low porosity exterior shell has a thickness of 0.02 to 3% of a thickness of the high porosity fiber cement core.

2. The variable porosity fiber cement article of claim 1, wherein the integrally formed low porosity exterior shell comprises at least one laminate layer.

3. The variable porosity fiber cement article of claim 1, wherein the high porosity fiber cement core comprises cellulose fibers.

4. The variable porosity fiber cement article of claim 1, wherein the porosity of the integrally formed low porosity exterior shell differs from the porosity of the high porosity fiber cement core by about 5% to 30%.

5. The variable porosity fiber cement article of claim 1, wherein the thickness of the integrally formed low porosity exterior shell is between about 50 and 150 µm.

6. A fiber cement article comprising:
a fiber cement substrate comprising two opposing lateral faces and at least one side surface extending therebetween;
an integrally formed fiber cement shell disposed on at least one of the lateral faces of the fiber cement substrate, said integrally formed fiber cement shell covering a substantial portion of the at least one lateral face, said integrally formed fiber cement shell having a thickness between about 50 and 150 µm; and
wherein the integrally formed fiber cement shell has a lower porosity value than that of the fiber cement substrate and a lower surface roughness value than that of the at least one side surface of the fiber cement substrate, thereby providing a protective and smooth integrally formed exterior surface for the fiber cement article.

7. The fiber cement article of claim 6, wherein the integrally formed fiber cement shell is disposed on two opposing lateral faces of the fiber cement substrate.

8. The fiber cement article of claim 6, wherein the thickness of the integrally formed fiber cement shell is 0.02 to 3% of a thickness of the fiber cement substrate.

9. The fiber cement article of claim 6, wherein the fiber cement substrate and the integrally formed fiber cement shell comprise cellulose fibers.

10. The fiber cement article of claim 6, wherein the porosity of the integrally formed fiber cement shell differs from the porosity of the fiber cement substrate by about 5% to 30%.

11. A fiber cement article comprising:
a substrate comprising a fiber cement composition including cellulose fibers, the substrate further comprising two opposing lateral faces and at least one side surface extending therebetween;
an integrally formed shell comprising the fiber cement composition, the integrally formed shell disposed on at least one of the lateral faces of the substrate, said integrally formed shell covering a substantial portion of the at least one lateral face and having a thickness between about 50 and 150 µm; and
wherein the integrally formed shell has a lower porosity value than that of the substrate and a lower surface roughness value than that of the at least one side surface of the substrate, thereby providing a protective and smooth integrally formed exterior surface for the fiber cement article.

12. A fiber cement article comprising:
a substrate comprising a fiber cement composition including cellulose fibers, the substrate further comprising two opposing lateral faces and at least one side surface extending therebetween;
an integrally formed shell comprising the fiber cement composition, the integrally formed shell disposed on at least one of the lateral faces of the substrate, said integrally formed shell covering a substantial portion of the at least one lateral face and having a thickness that is 0.02 to 3% of a thickness of the substrate; and
wherein the integrally formed shell has a lower porosity value than that of the substrate and a lower surface roughness value than that of the at least one side surface of the substrate, thereby providing a protective and smooth integrally formed exterior surface for the fiber cement article.

13. The fiber cement article of claim 12, wherein the surface roughness value of the integrally formed shell is between 16 Rq and 9 Rq.

14. The fiber cement article of claim 13, wherein the surface roughness value of the integrally formed shell is about 15 Rq.

15. The fiber cement article of claim 12, wherein the substrate has a density that is between about 1 and 1.33 g/cm$^3$.

16. The fiber cement article of claim 12, wherein the integrally formed shell has a density that is between about 1.1 and 1.8 g/cm$^3$.

17. The fiber cement article of claim 12, wherein a mean porosity of the integrally formed shell differs from the porosity of the substrate by at least 25%.

18. The fiber cement article of claim 12, wherein the integrally formed shell has a density that is greater than a density of the substrate.

19. The fiber cement article of claim 12, wherein the fiber cement article is a fiber cement wall panel.

* * * * *